(12) United States Patent
Hsing et al.

(10) Patent No.: US 6,735,310 B1
(45) Date of Patent: May 11, 2004

(54) TECHNIQUE OF PASSWORD ENCRYPTION AND DECRYPTION FOR USER AUTHENTICATION IN A FEDERATED CONTENT MANAGEMENT SYSTEM

(75) Inventors: Michael Chi-Pei Hsing, San Jose, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,439

(22) Filed: Sep. 17, 1999

(51) Int. Cl.$^7$ .............................. H04K 1/00; H04L 9/00
(52) U.S. Cl. ............................ 380/28; 380/55; 380/51; 380/29; 713/182; 713/184; 713/168; 713/202
(58) Field of Search .............................. 380/55, 51, 29, 380/28; 713/182, 168, 202, 184

(56) References Cited

U.S. PATENT DOCUMENTS

| | | | |
|---|---|---|---|
| 3,057,955 A | * 10/1962 | Hirsch | ......................... 380/27 |
| 5,272,754 A | 12/1993 | Boerbert | |
| 5,416,841 A | * 5/1995 | Merrick | ....................... 380/29 |
| 5,442,342 A | 8/1995 | Kung | |
| 5,455,953 A | 10/1995 | Russell | |
| 5,469,363 A | 11/1995 | Saliga | |
| 5,497,421 A | 3/1996 | Kaufman et al. | |
| 5,499,017 A | 3/1996 | Beigel | |
| 5,604,490 A | 2/1997 | Blakley, III et al. | |
| 5,732,137 A | 3/1998 | Aziz | |
| 5,740,361 A | * 4/1998 | Brown | ....................... 713/201 |
| 5,874,902 A | 2/1999 | Heinrich et al. | ....... 340/825.54 |
| 5,894,519 A | 4/1999 | Clemot et al. | ................. 380/23 |

FOREIGN PATENT DOCUMENTS

| EP | 0 851 335 A2 | 7/1998 |
|---|---|---|
| JP | 10-154977 | 6/1998 |
| WO | WO 98/47258 | 10/1998 |

OTHER PUBLICATIONS

IBM Technical Disclosure Bulletin, "OpenDoc Container Security Encryption Technique for Stored Data," vol. 38, No. 04, pp. 591–592, Apr. 1995.
IBM Technical Disclosure Bulletin, "Secure Remote Configuration for Networked Computer Systems," vol. 41, No. 01, pp. 653–655, Jan. 1998.
S. Halevi, et al., "Public–Key Cryptography and Password Protocols," 5th ACM Conference on Computer and Communications Security, San Francisco, CA, Nov. 2–5, 1998.
Klein A. Bruggemann, et al., "The MeDoc Library: Security Aspects," Digital Libraries in Computer Science: The MeDoc Approach, Berlin, Germany, pp. 103–114, 1998.
J. Botting, "Security on the Internet: Authenticating the User," Telecommunications (International Edition), vol. 31, No. 12, pp. 77–78, Dec. 1997.
D. White, "Distributed Systems Security," DBMS, vol. 10, No. 12, pp. 44–48, 50, 52, and 78, Nov. 1997.
ST Kent, et al., "Personal Authentication System for Access Control to the Defense Data Network," Conference Record of Eascon 82, 15th Annual Electronics and Aerospace Systems Conference, Washington, D.C., Sep. 20–22, 1982.

* cited by examiner

*Primary Examiner*—Thomas R. Peeso
*Assistant Examiner*—Joseph M McArdle
(74) *Attorney, Agent, or Firm*—Sughrue Mion, PLLC

(57) ABSTRACT

A technique for password encryption and decryption for user authentication in a federated content management system. One or more commands are executed in a computer to perform a datastore operation on a datastore connected to the computer. A string of characters are received. The string of characters is encrypted based on a first character standard. Then, the encrypted string of characters is transformed to be compatible with a second character standard.

45 Claims, 7 Drawing Sheets

TECHNIQUE OF PASSWORD ENCRYPTION AND DECRYPTION FOR USER AUTHENTICATION IN A FEDERATED CONTENT MANAGEMENT SYSTEM

BACKGROUND OF THE INVENTION

1. Field of the Invention

This invention relates in general to database management systems performed by computers, and in particular, to a technique of password encryption and decryption for user authentication in a federated content management system.

2. Description of Related Art

The present invention relates to a system and method for representing and searching multiple heterogeneous datastores and managing the results of such searches. Datastore is a term used to refer to a generic data storage facility, such as a relational data base, flat-file, hierarchical data base, etc. Heterogeneous is a term used to indicate that the datastores need not be similar to each other. For example, each datastore may store different types of data, such as image or text, or each datastore may be based on a different theory of data model, such as Digital Library/VisualInfo or Domino Extended Search (DES).

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

The indexing of business data is often imbedded into the data itself. When the automated business process stores a person's name in the column "NAME," it actually indexes that information. Multimedia information objects usually do not contain indexing information. This "meta data" needs to be created in addition by developers or librarians. The indexing information for multimedia information is often kept in "business like" databases separated from the physical object.

In a Digital Library (DL), the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc. . . . can be used when appropriate.

The indexing information used for catalog searches in physical libraries is mostly what one can read on the covers of the books: authors name, title, publisher, ISBN, . . . enriched by other information created by librarians based on the content of the books (abstracts, subjects, keywords, . . . ). In digital libraries, the entire content of books, images, music, films, etc. . . . are available and "new content" technologies are needed; technologies for full text searching, image content searching (searching based on color, texture, shape, etc. . . . ), video content searching, and audio content searching. The integrated combination of catalog searches (e.g. SQL) with content searches will provide more powerful search and access functions. These technologies can also be used to partially automate further indexing, classification, and abstracting of objects based on content.

To harness the massive amounts of information spread throughout these networks, it has become necessary for a user to search numerous storage facilities at the same time without having to consider the particular implementation of each storage facility.

Object-oriented approaches are generally better suited for such complex data management. The term "object-oriented"

refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Some known programming tools that can be used for developing search and result-management frameworks include IBM VisualAge C++, Microsoft Visual C++, Microsoft Visual J++, and Java.

There is a need in the art for an improved federated system. In particular, there is a need in the art for a technique of password encryption and decryption for user authentication in a federated content management system.

SUMMARY OF THE INVENTION

To overcome the limitations in the prior art described above, and to overcome other limitations that will become apparent upon reading and understanding the present specification, the present invention discloses a method, apparatus, and article of manufacture for a technique of password encryption and decryption for user authentication in a federated content management system.

According to an embodiment of the invention, one or more commands are executed in a computer to perform a datastore operation on a datastore connected to the computer. A string of characters are received. The string of characters is encrypted based on a first character standard. Then, the encrypted string of characters is transformed to be compatible with a second character standard.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Federated Architecture

Figure 1:
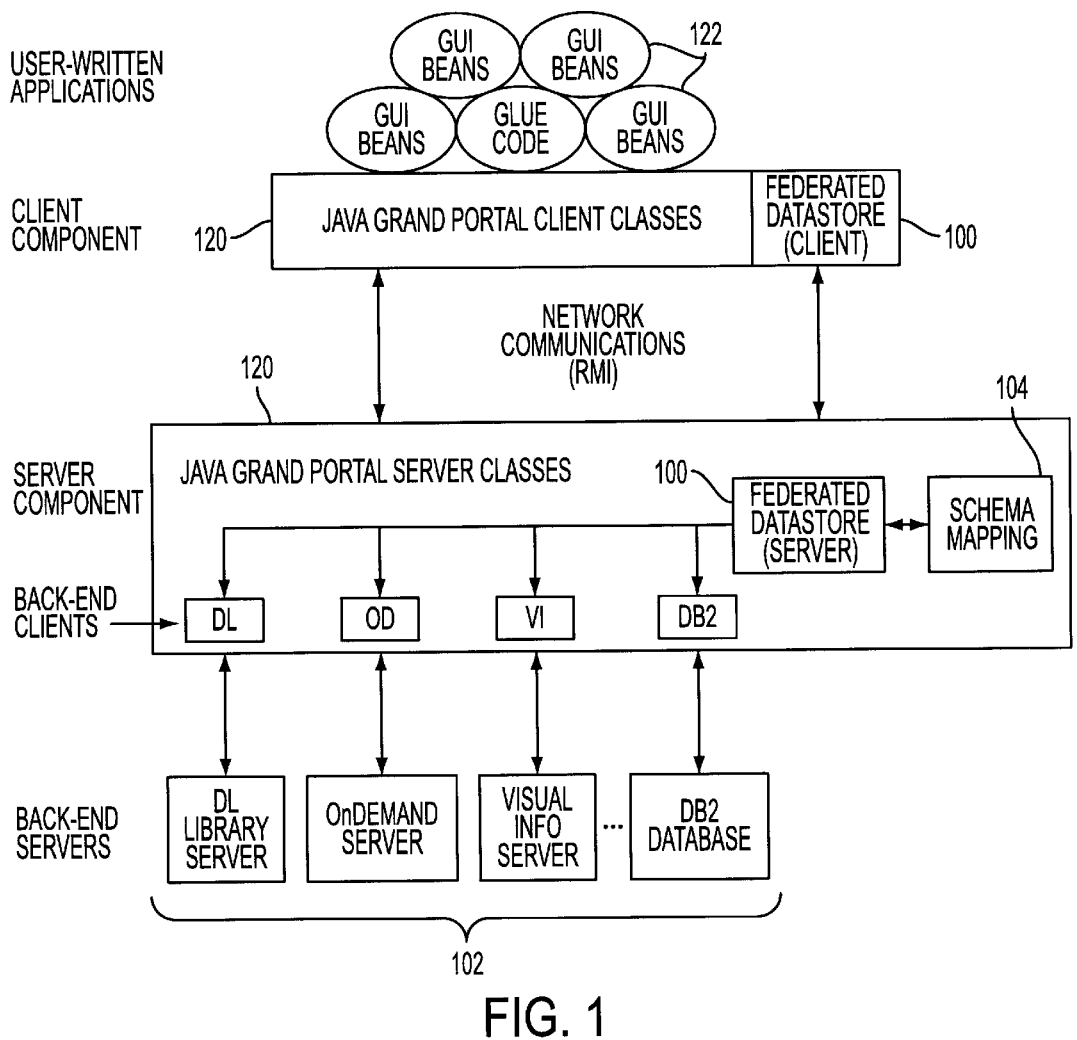
FIG. 1 is a diagram illustrating a computer architecture that could be used in accordance with the present invention.

FIG. 1 is a diagram illustrating a computer architecture that could be used in accordance with the present invention.

The present invention is described herein by way of example and is not intended to be limited to the described embodiment. The description of the preferred embodiment is based on, but certainly not limited to, the IBM design of Java Grand Portal Class Library, the Digital Library Java Application Programming Interface (API).

The Java Grand Portal 120 is comprised of client and server classes. In particular, Java Grand Portal is a set of Java classes which provides access and manipulation of local or remote data stored in Digital Library storage facilities. It uses a Java API based on OMG-Object Query Services (OQS) and a Dynamic Data Object protocol, which is a part of OMG/Persistence Object Services.

The Java API provides multi-search capabilities such as:
1. Searching within a given datastore using one or a combination of supported query types, i.e.,
    Parametric query—Queries requiring an exact match on the condition specified in the query predicate and the data values stored in the datastore.
    Text query—Queries on the content of text fields for approximate match with the given text search expression, e.g. the existence (or non-existence) of certain phrases or word-stems.
    Image query—Queries on the content of image fields for approximate match with the given image search expression, e.g. image with certain degree of similarity based on color percentages, layout, or texture.
2. Each search type is supported by one or more search-engines.
3. Searching on the results of a previous search.
4. Searching involving heterogeneous datastores.

The Digital Library Grand Portal classes provide a convenient API for Java application users; the applications can be located at local or remote sites. Java classes will typically reside on both server and client sides; both sides providing the same interface. The client side of Java classes communicates with the server side to access data in the Digital Library through the network. Communication between client and server sides is done by these classes; it is not necessary to add any additional programs.

In particular, FIG. 1 is an architectural diagram outlining the structure of the federated search for Digital Library repositories using the federated datastore 100, comprised of a federated datastore client and server. A federated datastore 100 is a virtual datastore which combines several heterogeneous datastores 102 into a consistent and unified conceptual view. This view, or a federated schema, is established via schema mapping 104 of the underlying datastores. The users interact with a federated datastore 100 using the federated schema, without needing to know about the individual datastores 102 which participate in the federated datastore 100.

One embodiment of the invention provides a password system that supports password encryption and decryption for user authentication in a federated content management system. In one embodiment of the invention, one or more programs or functions implement the password system. In one embodiment, these programs and functions reside at the federated datastore.

The federated datastore 100 does not have a corresponding back-end client. Since it is a virtual datastore, the federated datastore 100 relies on the underlying physical back-end client associated with it, such as the DL client (i.e., Digital Library client), OnDemand, VisualInfo, etc. As mentioned before, this association is established by a schema mapping component 104.

The communication between the federated datastore 100 client and server can be done by any appropriate protocol. On top of Java Grand Portal client classes, the users can develop application programs using, for example, any existing Java Beans 122 development environment.

The federated datastore 100 coordinates query evaluation, data-access, and transaction processing of the participating heterogeneous datastores 102. Given the federated schema, a multi-search query can be formulated, executed, and coordinated to produce results in the form of a datastore-neutral dynamic data object.

Note that each heterogeneous datastore and the federated datastore are created using one datastore definition. The federated datastore 100 and the heterogeneous datastores 102 are all subclasses of a class called Datastore, therefore, all of these datastores 100 and 102 have the same interface. Therefore, a user would be able to access the federated datastore 100 and the heterogeneous datastores 102 in a consistent and uniform manner.

Additionally, the objects stored in the federated datastore 100 and the heterogeneous datastores 102 are subclasses of an Object class. The Object class includes subclasses for dynamic data objects (DDOs) and extended data objects (XDOs). A DDO has attributes, with type, value, and properties. The value of an attribute can be a reference to another DDO or XDO, or a collection of DDOs or XDOs.

Figure 2:
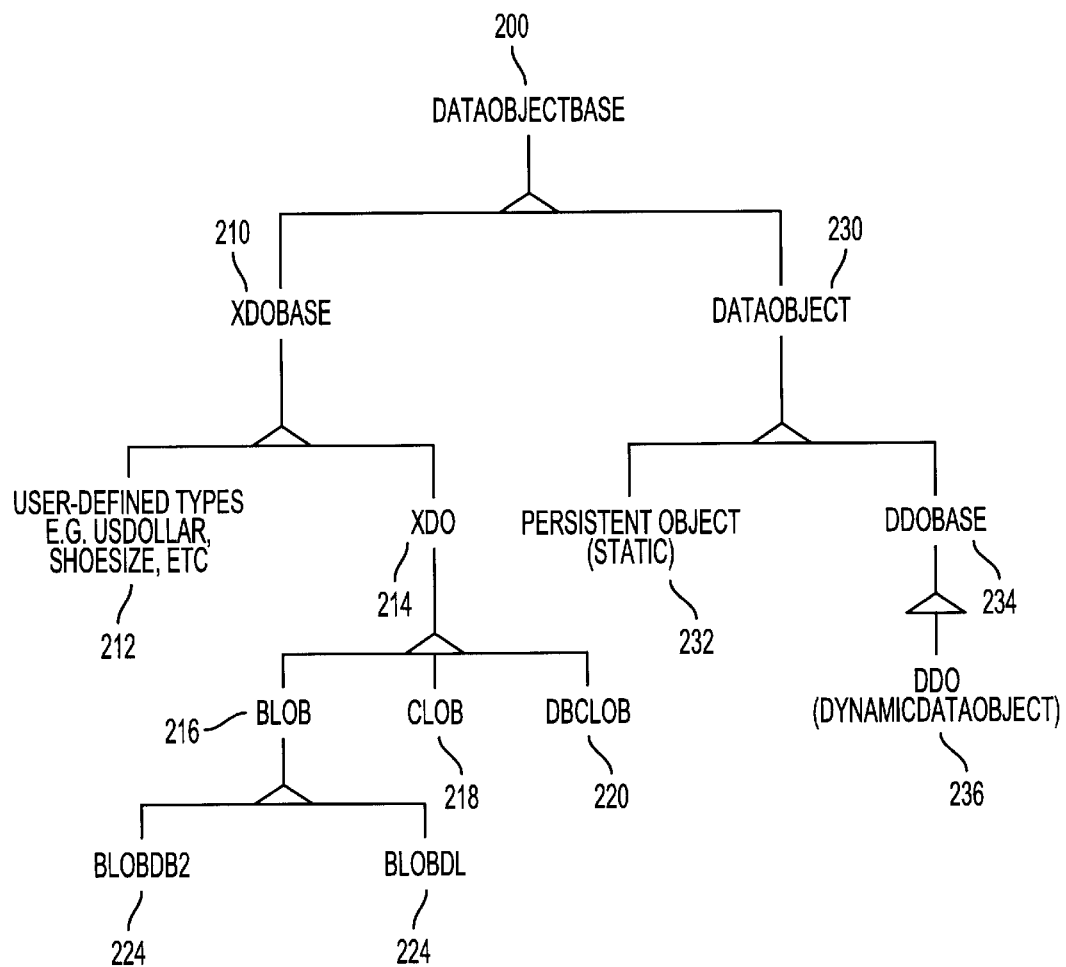
FIG. 2 is a diagram illustrating a class hierarchy for Data Object classes.

FIG. 2 is a diagram illustrating a class hierarchy for Data Object classes. The objects stored in and manipulated by the datastores and fetch operations belong to data object classes. These objects are returned as the result of a fetch, or created and used in CRUD (add, retrieve, update, delete) operations.

A DataObjectBase 200 is an abstract base class for all data objects known by datastores. It has a protocol attribute, that indicates to the datastore which interface can be used to operate on this object. A XDOBase 210 is the base class used to represent user-defined-types (UDT) or large objects. In particular, the XDOBase 210 is the base class for some user-defined types 212 and XDOs 214. A XDO 214 represents complex UDTs or large objects (LOB). This object can exist stand-alone or as a part of a DDO 236. Therefore, it has a persistent object identifier and CRUD operations capabilities.

Blob 216 is a base class for BLOBs as a placeholder to share all generic operations pertaining to BLOBs. Clob 218 is a base class for CLOBs (Character Large Objects) as a placeholder to share all generic operations pertaining to CLOBs. DBClob 220 is a base class for DBCLOBs (database character large object) as a placeholder to share all generic operations pertaining to DBCLOBs. BlobDB2 222 represents a BLOB specific to DB2, and BlobDL 22 represents a BLOB specific to DL. Similarly, though not shown, there may be subclasses for ClobDB2, ClobDL, etc.

A DataObject 230 is a base class for PersistentObject 232 and DDOBase 234. A PersistentObject 232 represents a specific object whose code is statically generated and compiled. This type of object will not be covered in this document. A DDOBase 234 is a base class for a dynamic data object 236 (without the CRUD methods). A DDO (Dynamic Data Object) 236 represents generic data objects which are constructed dynamically at runtime. This object fits well with query and browsing activities in Portal where objects are only known and generated at runtime. It supports the CRUD operations (add, retrieve, update, and delete), and, with the help of its associated datastore, a DDO can put itself into and out of the datastore.

One skilled in the art would recognize that these are only example classes and subclasses and other structures maybe used for objects and other classes or subclasses may be added to or removed from the tree shown in FIG. 2.

With respect to the notion of "federation", each participating datastore preserves the right to maintain its "personality", i.e. its own query language, data-model or schema, method of interaction, etc, and at the same time cooperating in a federation to provide a federated schema. This design allows the users to preserve the natural view to their favorite datastore as well as access them in conjunction with other datastores in a federated context. The federated datastore 100 can combine the participating native datastores in two ways:

With mapping. As described above, mapping of concepts across participating datastores is established to provide a unified conceptual view. Based on this federated schema, federated queries with both join and union expressions can be formulated.

Without mapping. In this case, the federated datastore 100 only reflects the union of each participating datastore's conceptual view. Although it coordinates query processing and data-access for each underlying datastore, the federated datastore 100 must accept queries in each datastore's native language since the query translation process can not be performed without mapping. In addition, since there is no conceptual mapping between datastores, the FederatedQuery 19 results can only reflect the union of results from each datastore.

The embodiment of the invention is incorporated into one or more software programs that reside at the federated datastore 100. Generally, the software programs and the instructions derived therefrom, are all tangibly embodied in a computer-readable medium, e.g. one or more of the data storage devices, which may be connected to the federated datastore 100. Moreover, the software programs and the instructions derived therefrom, are all comprised of instructions which, when read and executed by the computer system 100, causes the computer system 100 to perform the steps necessary to implement and/or use the present invention. Under control of an operating system, the software programs and the instructions derived therefrom, may be loaded from the data storage devices into a memory of the federated datastore 100 for use during actual operations.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Federated Datastore

Figure 3:
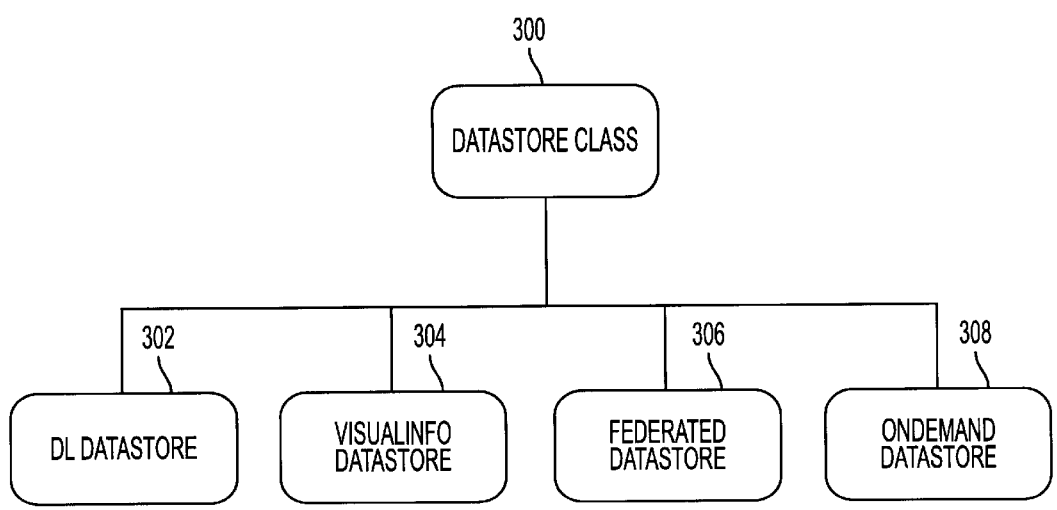
FIG. 3 is a diagram illustrating a class hierarchy for Datastore classes.

FIG. 3 is a diagram illustrating a class hierarchy for Datastore classes. A main datastore class 300 is an abstract base class (i.e., superclass) for all datastores. In particular, some datastore classes that are based on the datastore class 300 and inherit its characteristics are the following: a DL Datastore class 302, a VisualInfo Datastore class 304, a Federated Datastore class 306, and an OnDemand Datastore class 308.

Figure 4:
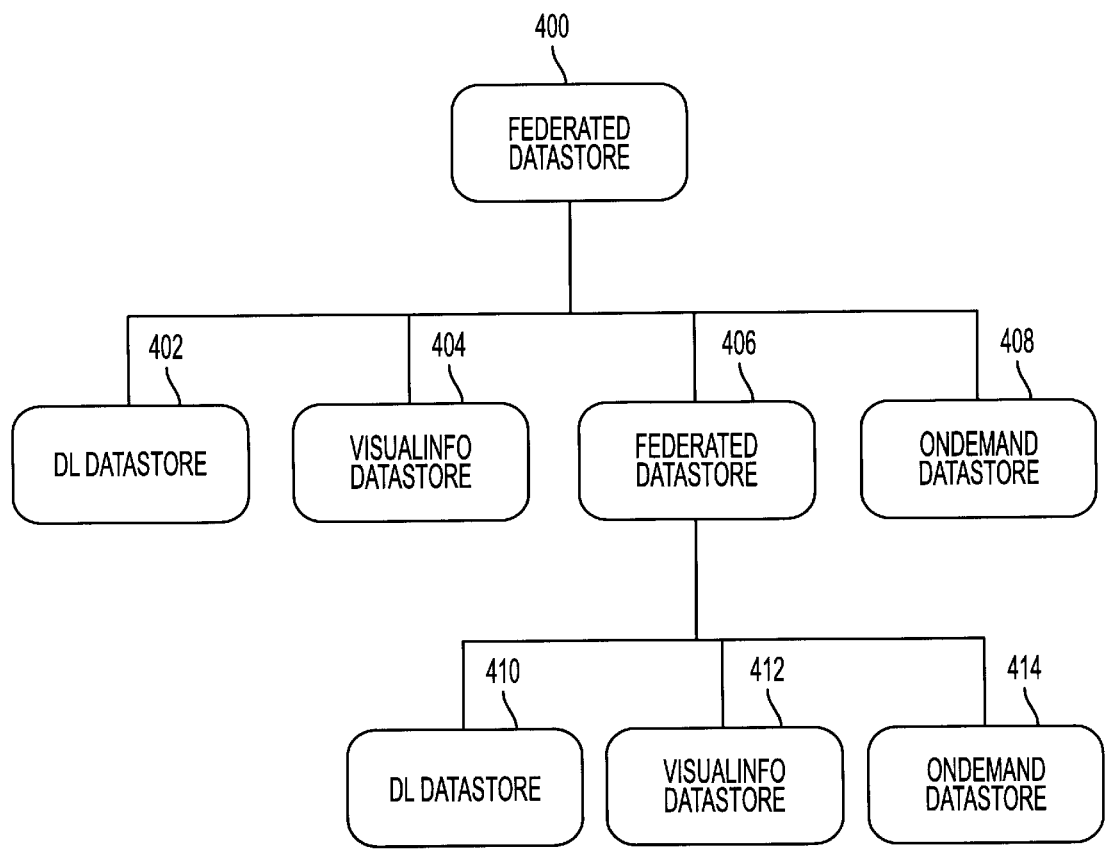
FIG. 4 is a diagram illustrating one composition of a federated datastore.

FIG. 4 is a diagram illustrating one composition of a federated datastore. The federated datastore 400 connects to heterogeneous datastores 402, 404, 406, and 408. As illustrated, a federated datastore 406 may connect to and be nested under federated datastore 400. Additionally, the federated datastore 406 may connect to heterogeneous datastores 410, 412, and 414. The depicted architecture is only a sample, and one skilled in the art would recognize that other examples fall within the scope of the invention.

In the preferred embodiment, the federated datastore 100 takes query strings expressed in a federated query language. An example class definition for DatastoreFederated 100 is set forth below.

```
DKDatastoreFed.java
    package com.ibm.mm.sdk.server;
    public class DKDatastoreFed extends dkAbstractDataStore
        implements DKConstantFed,
            DKConstant,
            DKMessageIdFed,
            DKMessageId,
            dkFederation,
            javaio.Serializable
    {
    public dkCollection listEntities( ) throws DKException,
        Exception
    public String[ ] listEntityNames( ) throws DKException,
        Exception
    public String[ ] listTextEntityNames( ) throws
        DKException, Exception
    public String[ ] listPainEntityNames( ) throws
        DKException, Exception
    public dkCollection listEntityAtts(String entityName)
        throws DKExcepion, Exception
    public String[ ] listEntityAttrNames(String entityName)
        throws DKException, Exception
    public String registerMapping(DKNVPair sourceMap)
        throws DKException, Exception
    public void unRegisterMapping(String mappingname)
        throws DKException, Exception
    public String[ ] listMappingNames( ) throws
        DKException, Exception
    public dkSchemaMapping getMapping(String
        mappingName) throws DKException,
        Exception
    public synchronized dkExtension getExtension(String
        extensionName) throws
        DKException, Exception
    public synchronized void addExtension(String
        extensionName,
        dkExtension extensionObj) throws DKException,
            Exception
    public synchronized void removeExtension(String
        extensionName) throws
        DKException, Exception
    public synchronized String[ ] listExtensionNames( )
        throws DKException, Exception public DKDDO
        createDDO(String objectType,
            int Flags) throws DKException, Exception
    public dkCollection listSearchTemplates( ) throws
        DKException, Exception
    public String[ ] listSearchTemplateNames( ) throws
        DKException, Exception
    public dkSearchTemplate getSearchTemplate(String
        templateName) throws
        DKException, Exception
    public void destroy( ) throws DKException, Exception
    public synchronized string addRemoveCursor
        (dkResultSetCursor iCurt int action)
        throws DKException, Exception
    public dkDatastore datastoreByServerName (String
        dsType, String dsName)
        throws DKException, Exception
    public void changePassword (String serverName,
        String user Id,
        String oldPwd,
        String newPwd)
        throws DKException, Exception
    public void requestConnection (String serverName,
        String userId,
        String passwd,
        String connectString)
        throws DKException, Exception
    public void excludeServer (Sting serverName, String
        templateName)
        throws DKException, Exception
    public boolean isServerExcluded (String serverName,
        String templateName)
        throws DKException, Exception, java.rmi.RemoteException
    public String[ ] listExcludedServers(String
        templateName) throws DKException,
        Exception
    public void clearExcludedServers(String templateName)
        throws DKException,
        Exception
    };ps
```

The following methods are part of the federated datastore class:

public DKDatastoreFed( ) throws DKException, Exception
    Constructs default Federated Datastore.
public DKDatastoreFed(String configuration) throws DKException, Exception
    Constructs default Federated Datastore.
public void connect(String datastore_name,
    String user_name,
    String authentication,
    String connect_string) throws DKException, Exception
    Establishes a connection to a federated datastore.
    Parameters:
        datastore_name—federated datastore name
        user_name—userid to logon to this federated datastore
        authentication—password for this user_namne
        connect_string—additional information string
    Throws: DKException
        if either:
        datastore_narne, user_name, or authentication is null
        or if error occurs in the federated datastore
        Overrides:
            connect in class dkAbstractDatastore
public void disconnect( ) throws DKException, Exception
    Disconnects from the federated datastore.
    Throws: DKException
        if unable to disconnect from server.

Overrides:
   disconnect in class dkAbstractDatastore
public Object getOption(int option) throws DKException
   Gets defined datastore option
   Parameters:
      option—an option id
   Returns:
      the value for the given option
   Throws: DKException
      if option is not set
   Overrides:
      getOption in class dkAbstractDatastore
public void setOption(int option, Object value) throws DKException
   Sets the given "option" with a specific "value".
   Parameters:
      option—an option id
      value—the value for the "option"
   Throws: DKException
      if option/value is invalid
   Overrides:
      setOption in class dkAbstractDatastore
public Object evaluate(String command,
   short commandLangType,
   DKNVPair params[ ]) throws DKException, Exception
   Evaluates a query and returns the result as a dkQueryableCollection object.
   Parameters:
      command—a query stirng that represent the query criteria
      commandLangType—a query language type, for Federated, it will be
         DK_FEDERATED_QL_TYPE
      params—a narne/value pairs list
   Returns:
      a query result collection
   Throws: DKException
      if "command" argument is null
   Overrides:
      evaluate in class dkAbstractDatastore
public Object evaluate(dkQuery query) throws DKException, Exception
   Evaluates a query and returns the result as a DKAny containing dkQueryableCollection.
   Parameters:
      query—a given query object
   Returns:
      a query result collection
   Throws: DKException
      if the "query" input is null or not of federated query type.
   Overrides:
      evaluate in class dkAbstractDatastore
public Object evaluate(DKCQExpr qe) throws DKException, Exception
   Evaluates a query.
   Parameters:
      qe—a common query expression object
   Returns:
      a collection of the results
   Throws: DKException
      if common query expression object is invalid
   Overrides:
      evaluate in class dkAbstractDatastore
public dkResultSetCursor execute(String command,
   short commandLangType,
   DKNVPair params[ ]) throws DKException, Exception
   Executes a command query of the federated datastore and returns a result set cursor.
   Parameters:
      command—a query string that represents the query criteria.
      commandLangType—a query language type, for Federated, it will be
         DK_FEDERATED_QL_TYPE.
      params[ ]—a name/value pairs list.
   Returns:
      a dkResultSetCursor object.
   Throws: DKException
      if "command" is null or invalid, or "commandLangType" is not Federated Query type.
   Overrides:
      execute in class dkAbstractDatastore
public dkResultSetCursor execute(dkQuery query) throws DKException, Exception
   Executes a command query of the federated datastore and returns a result set cursor. This method takes a Federated query object as an argument.
   Parameters:
      query—a federated dkQuery object
   Returns:
      a dkResultSetCursor object
   Throws: DKException
      if "query" object is null or query.qlType( ) is not
   DK_FEDERATED_QL_TYPE
   Overrides:
      execute in class dkAbstractDatastore
public dkResultSetCursor execute(DKCQExpr cqe) throws DKException, Exception
   Executes a query expression.
   Parameters:
      cqe—a common query expression object
   Returns:
      resultSetCursor which represents a federated datastore cursor.
   Throws: DKException
      if "cqe" object is invalid
   Overrides:
      execute in class dkAbstractDatastore
public void execute WithCallback(dkQuery query,
   dkcallback callbackObj) throws DKException, Exception
   Executes a query with callback function.
   Parameters:
      query—a query object
      callbackObj—a dkCallback object
   Overrides:
      executeWithCallback in class dkAbstractDatastore
public void execute WithCallback(String command
   short commandLangType,
   DKNVPair params[ ],
   dkcallback callbackObj) throws DKException, Exception
   Execute the query with callback function.

Parameters:
   command—a query string
   commandLang—a query type
   params—additional query option in name/value pair
   callbackObj—a dkCallback object Overrides:
   executeWithCallback in class dkAbstractDatastore public void execute WithCallback(DKCQExpr cqe,
   dkCallback callbackObj) throws DKException, Exception Execute a query expression with callback function.

Parameters:
   cqe—a common query expression object
   callbackObj—a dkCallback object Overrides:
   executeWithCallback in class dkAbstractatastore public dkQuery createQuery(String command,
   short commandLangType,
   DKNVPairparams[ ]) throws DKException Creates a federated query object.

Parameters:
   command—a query string that represents the query criteria
   commandLangType—a query language type, it will be one of the following:
     DK_CM_TEMPLATE_QL_TYPE
     DK_CM_TEXT_QL_TYPE
     DK_CM_IMAGE_QL_TYPE
     DK_CM_PARAMETRIC_QL_TYPE
     DK_CM_COMBINED_QL_TYPE
   params[ ]—a name/value pairs list Returns:
   a federated dkQuery object Throws: DKException
   if "command" is null Overrides:
   createQuery in class dlkAbstractDatastore public dkQuery createQuery(DKCQExpr qe) throws DKException Creates a query object.

Parameters:
   cqe—a common query expression object

Throws: DKException
   if "cqe" object is invalid

Overrides:
   createQuery in class dkAbstractDatastore public dkcollection listDataSources( ) throws DKException List the available datastore sources that a user can connect to.

Returns:
   a collection of ServerDef objects describing the servers

Throws: DKException
   if internal error occurs from server

Overrides:
   listDataSources in class dkAbstractDatastore public String[ ] listDataSourceNames( ) throws DKException Gets a list of datasource names.

Returns:
   an array of datasource names

Throws: DKException
   if error occurs when retrieving datasource names

Overrides:
   listDataSourceNames in class dkAbstractDatastore public void addObject(dkDataObject dataobj) throws DKException, Exception Adds a DDO object—since federated datastore does not allow adding object dynamically, this method will throw DKUsageError exception.

Parameters:
   ddo—a Federated object to be added.

Throws: DKException
   is thrown for all calls to this method.

Overrides:
   addObject in class dkAbstractDatastore public void deleteObject(dkDataObject dataobj) throws DKException, Exception Deletes a data object.

Parameters:
   ddo—a federated DDO object to be deleted

Throws: DKException
   since Federated server does not support deletion of documents for now.

Overrides:
   deleteObject in class dkAbstractDatastore public void retrieveObject(dkDataObject dataobj) throws DKException, Exception Retrieves a data-object.

Parameters:
   ddo—document object to be retrieved.

Throws: DKException
   when retrieve failed.

Overrides:
   retrieveObject in class dkAbstractDatastore public void updateObject(dkDataObject dataobj) throws DKException, Exception Updates a data-object.

Parameters:
   ddo—the data-object to be updated.

Throws: DKException
   if error occurs in the datastore

Overrides:
   updateObject in class dkAbstractDatastore public void commit( ) throws DKException Commits all activities since the last commit. This method will do nothing for federated since this datastore does not support commit/rollback functions.

Throws: DKException
   is thrown since federated datastore does not support transaction scope for now.

Overrides:
   commit in class dkAbstractDatastore public void rollback( ) throws DKException Rolls back all activities since the last commit. This method will do nothing for federated datastore since it does not support commit/rollback functions yet.

Throws: DKException
   is thrown since Federated does not support transaction scope for now.

Overrides:
   rollback in class dkAbstractDatastore

```
public boolean isconnected( )
    Checks to see if the datastore is connected
    Returns:
        true if connected, false otherwise
    Overrides:
        isConnected in class dkAbstractDatastore
public DKHandle connection( ) throws Exception
    Gets the connection handle for the datastore.
    Returns:
        the connection handle
    Overrides:
        connection in class dkAbstractDatastore
public DKHandle handle(String type) throws Exception
    Gets a datastore handle.
    Parameters:
        type—type of datastore handle wanted
    Returns:
        a datastore handle
    Overrides:
        handle in class dkAbstractDatastore
public String userName( )
    Gets the user name that user used to logon to the datastore.
    Returns:
        the userid that user used to logon
    Overrides:
        userName in class dkAbstractDatastore
public String datastoreName( ) throws Exception Gets the name of this datastore object. Usually it represents a datastore source's server name.

Returns:
        datastore name
    Overrides:
        datastoreName in class dkAbstractDatastore
public String datastoreType( ) throws Exception
    Gets the datastore type for this datastore object.
    Returns:
        datastore type
    Overrides:
        datastoreType in class dkAbstractDatastore
public dkDatastoreDef datastoreDef( ) throws
    DKException, Exception
    Gets datastore definition.
    Returns:
        the meta-data (dkDatastoreDef) of this datastore
    Overrides:
        datastoreDef in class dkAbstractDatastore
public dkcollection listEntities( ) throws DKException,
    Exception Gets a list of federated entities from Federated server.

Returns:
        a collection of dkEntityDef
    Throws: DKException
        if error occurs
    Overrides:
        listEntities in class dkAbstractDatastore
public String[ ] listEntityNames( ) throws DKException,
    Exception Gets a list of federated entities names from Federated server.

Returns:
        an array of names
    Throws: DKException
        if error occurs
    Overrides:
        listEntityNames in class dkAbstractDatastore
public String[ ] listTextEntityNames( ) throws
    DKException, Exception Gets a list of federated text search entities names from Federated server.

Returns:
        an array of names
    Throws: DKException
        if error occurs
public String[ ] listParmEntityNames( ) throws
    DKException, Exception Gets a list of federated parametric search entities names from Federated server.

Returns:
        an array of names
    Throws: DKException
        if error occurs
    Overrides:
        listEntityAttrs
public dkcollection listEntityAttrs(String entityName)
    throws DKException, Exception Gets a list of attributes for a given entity name.

Parameters:
        entityName—name of entity to retrieve attributes for
    Returns:
        a dkCollection of dkAttrDef objects
    Throws: DKException
        if the entity name does not exist
    Overrides:
        listEntityAttrs in class dkAbstractDatastore
public String[ ] listEntityAttrNames(String entityName)
    throws DKException, Exception Gets a list of attribute names for a given entity name.

Parameters:
        entityName—name of entity to retrieve attribute names for
    Returns:
        an array of attribute names
    Throws: DKException
        if the entity name does not exist
    Overrides:
        listEntityAttrNames in class dkAbstractDatastore
public String registerMapping(DKNVPair sourceMap)
    throws DKException, Exception Registers a mapping definition to this datastore. Mapping is done by entities.

Parameters:
        sourceMap—source name and mapping, a DKNVPair class with the following possible values:
```

("BUFFER",): buffer_ref is a reference to a string in memory ("FILE",): file_name is the name of the file containing the mapping
("URL",): URL-address location of the mapping
("LDAP",): LDAP file-narne
("SCHEMA",): a reference to a dkSchemaMapping object
defining the
    mapping. Currently, only "SCHEMA" option is supported, others
may be
    added later.
Returns:
    the name of the mapping definition.
Overrides:
    registerMapping in class dkAbstractDatastore
See Also:
    unRegisterMapping
public void unRegisterMapping(String mappingName) throws DKException, Exception Unregisters mapping information from this datastore.

Parameters:
    mappingName—name of the mapping information
Overrides:
    unRegisterMapping in class dkAbstractDatastore
See Also:
    registerMapping
public String[ ] listMappingNames( ) throws DKException, Exception Gets the list of the registered mappings for this datastore.

Returns:
    an array of registered mapping objects' names. The array length would be zero if there is no mapping registered.
Overrides:
    listMappingNames in class dkAbstractDatastore
See Also:
    registerMapping
public dkSchemaMapping getMapping(String mappingName) throws DKException, Exception Gets mapping information from this datastore.

Parameters:
    mappingName—name of the mapping information
Returns:
    the schema mapping object
Overrides:
    getMapping in class dkAbstractDatastore
See Also:
    registerMapping
public synchronized dkextension getExtension(String extensionName) throws DKException, Exception Gets the extension object from a given extension name.

Parameters:
    extensionName—name of the extension object.
Returns:
    extension object.

Overrides:
    getextension in class dkAbstractDatastore
public synchronized void addExtension(String extensionName, dkExtension extensionObj) throws DKException, Exception Adds a new extension object.

Parameters:
    extensionName—name of new extension object
    extensionObj—the extension object to be set
Overrides:
    addextension in class dkAbstractDatastore
public synchronized void removeExtension(String extensionName) throws DKException, Exception Removes an existing extension object.

Parameters:
    extensionName—name of extension object to be removed
Overrides:
    removeExtension in class dkAbstractDatastore
public synchronized String[ ] listExtensionNames( ) throws DKException, Exception Gets the list of extension objects' names.

Returns:
    an array of extension objects' names
Overrides:
    listExtensionNames in class dkAbstractDatastore
public DKDDO createDDO(String objectType, int Flags) throws DKException, Exception Creates a new DDO with object type, properties and attributes set for a given back-end server.

Parameters:
    objectType—the object type
    Flags—to indicate various options and to specify more detailed characteristics of the DDO to create. For example, it may be a directive to create a document DDO, a folder, etc.
Returns:
    a new DDO of the given object type with all the properties and attributes set, so that the user only needs to set the attribute values
Overrides:
    createDDO in class dkAbstractDatastore
public dkCollection listSearchTemplates( ) throws DKException, Exception Gets a list search templates from a federated server.

Returns:
    a DKSequentialCollection of search templates
Throws: DKException
    if internal datastore error occurs
public String[ ] listSearchTemplateNames( ) throws DKException, Exception Gets a list search templates' names from a federated server.

Returns:
    an array of search template names
Throws: DKException
    if internal datastore error occurs
public dkSearchTemplate getSearchTemplate(String templateName) throws DKException, Exception Gets a search template information from a given template name.

Returns:
    dkSearchTemplate object.
Throws: DKException
    if internal datastore error occurs
public void destroy( ) throws DKException, Exception datastore destroy—datastore cleanup if needed
    Overrides:
        destroy in class dkAbstractDatastore
public synchronized string addRemoveCursor (dkResultSetCursor iCurt int action) throws DKException, Exception
public dkdatastore datastoreByServerName (String dsType, String dsName) throws DKException, Exception Gets a reference to the specified datastore. The datastore must be connected, otherwise it will return null even if one is found. First, it will look in the free connection pool. If none found, it will look under the connection pool held by active cursors.

Parameters:
    <action> consider the case when transaction is active
public void changePassword (String serverName,
    String user Id,
    String oldPwd,
    String newPwd)
    throws DKException, Exception Changes the password of a given user Id for a specified server. Administrator only finction.

Parameters:
    userId—the user-id
    oldPwd—the old password
    newPwd—the new password
public void requestConnection (String serverName,
    String userId,
    String passwd,
    String connectString)
    throws DKException, Exception Requests a connection to a particular server with the given userid, password & connectString.

Parameters:
    userId—the user Id
    passwd—the password
    connectString—the connect string to logon
public void excludeServer (Sting serverName, String templateName) throws DKException, Exception Requests the named server to be skipped for the named search template.

Parameters:
    serverName—a back end server name
    templateName—a search template name
public boolean isServerExcluded (String serverName, String templateName) throws DKException, Exception, java.rmi.RemoteException Checks if the given server is in the excluded list for the named search template.

Parameters:
    serverName—a back end server name
    templateName—a search template name
Returns:
    true or false
public String[ ] listExcludedServers(String templateName) throws DKException, Exception Lists all the excluded servers for the named search template Parameters:
    s—templateName—a search template name
Returns:
    an array of server names that were excluded during search
public void clearExcludedServers(String templateName) throws DKException, Exception Clears all the excluded servers for the named search template Parameters:
    s—templateName—a search template name The following is sample syntax of a federated query string. However, it is to be understood that other syntax, including other parameters, may be used for the federated query string without departing from the scope of the invention.

```
PARAMETRIC_SEARCH=([ENTITY=entity_name,]
        [MAX_RESULTS=maximum_results,]
        [COND=(conditional_expression)]
        [; . . .]
     );
  [OPTION=([CONTENT=yes_no]
        )]
[and_or
TEXT_SEARCH=(COND=(text_search_expression)
     );
  [OPTION=([SEARCH_INDEX={search_index_name | (index_list) };]
        [MAX_RESULTS=maximum_results;]
        [TIME_LIMIT=time_limit]
        )]
]
[and_or
IMAGE_SEARCH=(COND=(image_search_expression)
     );
  [OPTION=([SEARCH_INDEX={search_index_name | (index_list) };]
        [MAX_RESULTS=maximum_results;]
        [TIME_LIMIT=time_limit]
        )]
]
```

There are several mechanisms for users to submit federated queries for execution. For example, users can create a federated query string and pass it to a federated query object and then invoke an execute or evaluate method on that object to trigger the query processing. Alternatively, a user can pass the federated query string to the execute or evaluate method in the federated datastore to process the query directly. The query string will be parsed into a federated query canonical form (query expression), which is essentially a datastore neutral representation of the query. In case the input query comes from a graphical user interface (GUI) based application, the query does not need to be parsed and the corresponding canonical form can be directly constructed.

The query canonical form is the input for the federated query processor module. This module will perform the following tasks:

Query translation. Translates the query canonical form into several native queries that corresponds to each native datastore associated to this federated datastore. The translation information is obtained from the schema mapping.

Data conversion. Converts data in the query into a native data type for each of the associated native datastores. This process uses the mapping and conversion mechanisms described in the schema mapping.

Data filtering. Filters only the relevant data during the construction of native queries.

Each native query is submitted to the corresponding native datastore for execution. Initially, the results returned are cursors to the data in each datastore.

The end-result of an initial query is a federated result set cursor object, which is a virtual collection (i.e., at this time, data has not actually been retrieved) of cursors to objects in each of the native datastores.

The user can retrieve the actual data using a fetch. When a fetch is issued for data, the data is returned by the native datastores to the federated query results processor module, which will do the following:

Data conversion. Converts data from the native type into a federated type according to the mapping information.

Data filtering. Filters the results to include only the requested data.

Result merging. Merges the results from several native datastores into a federated collection.

The federated result set cursor object provides the facility to separate query results according to the source native datastores. To do such a processing, the user/application may either use the federated cursor to fetch data or a native datastore cursor to fetch data from a particular datastore.

A FederatedQuery represents and executes queries across heterogeneous datastores. This query can be a combination of a DL parametric query, OnDemand query, and other query types involving supported datastores. To retrieve data from each datastore, the federated datastore delegates the query processing task to each of the native datastores.
FederatedQuey.java

```
package corn ibm.mm.sdk.server;
public class FederatedQuery implements Query
{
    public FederatedQuery(Datastore creator, String querystring);
    public FederatedQuery(FederatedQuery fromQuery);
    public void prepare(NVPair params[ ]);
    public void execute(NVPair params[ ]);
    public int status( );
    public Object result( );
    public short qlType( );
    public String querystring( );
    public Datastore datastore( );
    public dkResultSetCursor resultSetCursor( );
    public int numberOfResults( );
}
```

Schema Mapping

A schema mapping represents a mapping between the schema in a datastore with the structure of the data-object that the user wants to process in memory. Schema mapping has been generally described in U.S. patent application Ser. Nos. 08/276,382 and 08/276,747, also assigned to IBM.

A federated schema is the conceptual schema of a federated datastore 100, which defines a mapping between the concepts in the federated datastore 100 to concepts expressed in each participating datastore schema In general, a schema mapping handles the difference between how the data are stored in the datastore (as expressed by the datastore's conceptual schema) and how the user wants to process them in the application program. This mapping can also be extended to incorporate relationship associations among entities in a federated datastore, e.g., associating an employee's name with the appropriate department name. Since the mapping process can be a bit tedious, it is usually done with the help of a typical GUI-oriented schema mapping program.

In addition to schema-mapping information involving the mapping of entities and attributes, a federated datastore 100 must also have access to the following information:

User-id and password mapping. To support single sign-on features, each user-id in the federated datastore 100 needs to be mapped to its corresponding user-ids in the native datastores.

Datastore registration. Each native datastore needs to be registered so it can be located and logged-on to by the federated datastore 100 processes on behalf of its users.

A Technique of Password Encryption and Decrytion For User Authentication in a Federated Content Management System An embodiment of the invention provides a password system. The password system provides password encryption and decryption for user authentication in a federated content management system. As content is getting more complex and diversified, the system administration of a federated content management system for heterogeneous datastores is becoming more critical. The password system handles password encryption and decryption for various federated and native datastores, regardless of the language environments of these datastores (e.g., C, C++ or Java environments). Password encryption and decryption for user authentication is an important security mechanism in enterprise computing.

In a federated content management system, a user can log onto a federated datastore using a federated system administration tool and gain access to multiple heterogeneous back-end datastores (i.e., native datastores). In particular, the user enters only a federated user identifier (ID) and a federated password. Internally, at each native datastore, a mapping between a federated user ID/password and native user ID/password is stored (typically by a system administrator) in each native datastore. For security reasons, when the federated password is received by the federated datastore, the federated datastore needs to retrieve the native password from a native datastore in an encrypted format. The encrypted password is then decrypted by the federated datastore before it is used for logging on to a native datastore. The back-end datastores may consist of one or more datastores, such as one of the following: VisualInfo, Digital Library, OnDemand, ImagePlus 390, VisualInfo 400, and Domino.Doc.

A Data Encryption Standard (DES) system is used as the encryption/decryption technique. Encryption is the translation of data into a secret code. Encryption is an effective way to achieve data security. Decryption is the process of decoding data that has been encrypted. The DES system is a symmetric-key encryption system that uses a 56 bit key. The symmetric-key encryption system is an encryption system in which the sender and receiver of a message share a single, common key that is used to encrypt and decrypt the message. A key is used to read the encrypted data. A key refers to a password or table that is used to decipher encoded data.

The DES system has been standardized by the American National Standards Institute (ANSI). DES has been a popular encryption/decryption technique for over twenty years. Nevertheless, the use of DES to handle a password as a character string for user authentication has exposed some deficiencies. The DES system has a problem in decrypting an encrypted password as a character string. In particular, the DES system does not handle a "00000000" byte properly during string processing. The "00000000" byte refers to a computer-implemented zero, which is not a printable character.

Additionally, the DES system may be implemented in one language (e.g., the C language) in a native datastore, while the DES technique may be implemented in another language (e.g., the Java language) at the federated datastore. Use of the different languages leads to incompatibility in encryption and decryption. For example, the native datastore encrypts a native password using the C language DES implementation, which uses an ASCII standard. On the other hand, the federated datastore decrypts a native password using the Java language DES implementation, which uses a Unicode standard. In particular, a native password may contain a generated ASCII character, used by the C language, that is not compatible with the Unicode format used in the Java language.

ASCII is an acronym for the American Standard Code for Information Interchange. ASCII refers to a code for representing English characters as numbers, with each alphabet letter assigned a number from 0 to 127. For example, the ASCII code for uppercase M is 77. The native password is represented with ASCII codes. Additionally, the ASCII code may use 8 bits for a character, which enables encoding alphabet letters as well as non-English characters, graphics symbols, and mathematical symbols. Unicode is a standard for representing characters as integers. Unlike ASCII, which uses 8 bits for each character, Unicode uses 16 bits, which enables Unicode to represent many more characters than ASCII.

Furthermore, it is desirable to have a password contain printable characters. For example, this enables a user to manually input a password and also enables a user to forward a password to another user. Currently, the native password may contain non-printable characters.

The password system resolves these problems with a technique for handling password encryption and decryption for user authentication in a federated content management system.

Figure 5:
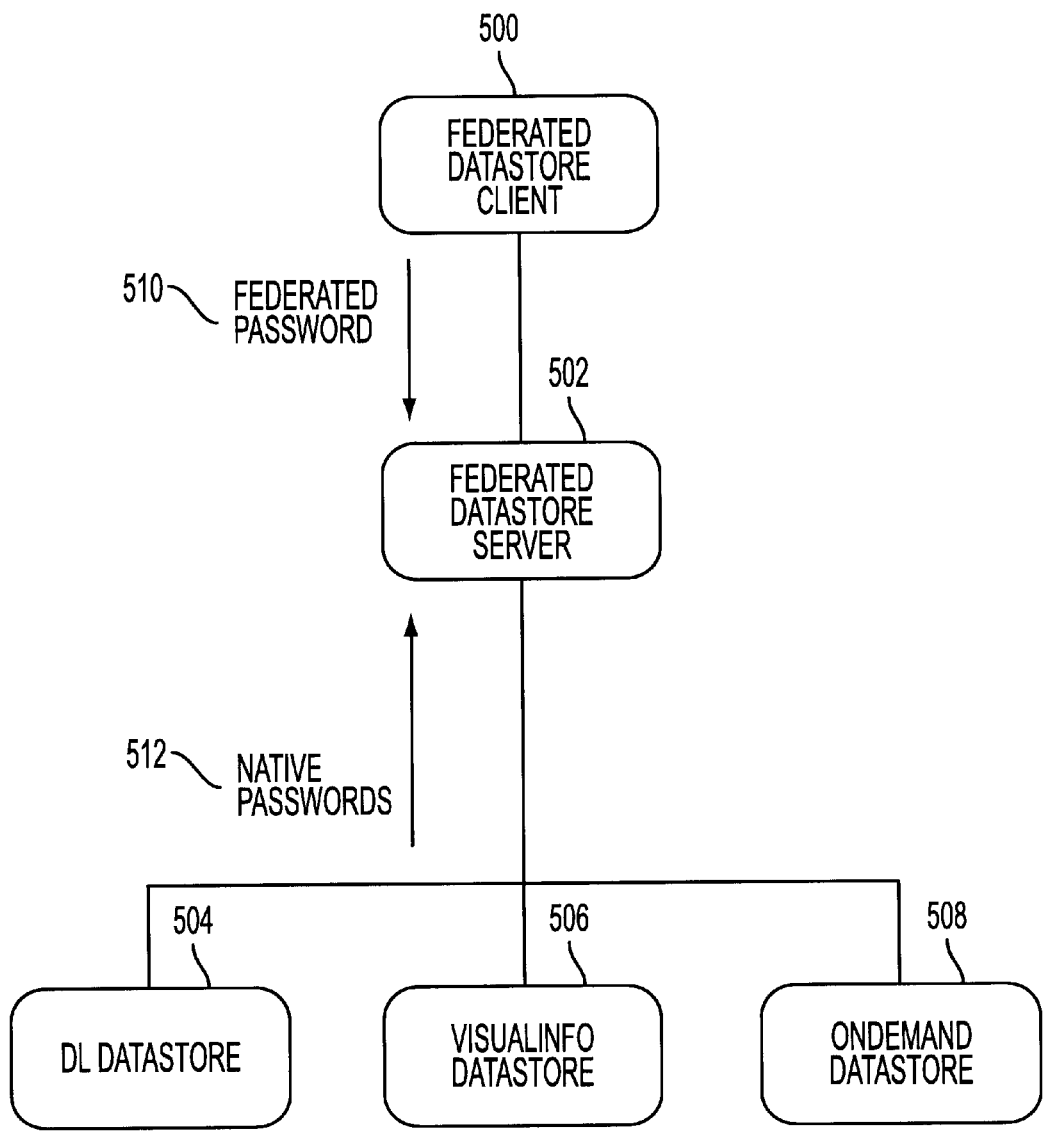
FIG. 5 is a diagram illustrating an overview of the password system.

FIG. 5 is a diagram illustrating an overview of the password system. A federated datastore client 500 is connected to a federated datastore server 502. The federated datastore server 502 is connected to several native datastores. The native datastores include a DL (Digital Library) datastore 504, a VisualInfo datastore 506, and an OnDemand datastore 508.

Initially, if a user would like to retrieve data from the native datastores 504, 506, or 508, the user submits a federated password 510 at the federated datastore client 500. Although not shown, a user may also submit the federated password 510 directly at the federated datastore server 502.

The federated datastore client 500 passes the federated password 510 to the federated datastore server 502. The federated datastore server 502 initially determines whether the federated password 510 is valid. If the federated password 510 is not valid, the federated datastore server 502 returns an indication to the user, via the federated datastore client 500, indicating that the submitted federated password 510 is not valid. If the federated password 510 is valid, the federated datastore server 502 maps the federated password for the user to one or more native passwords 512.

In particular, a system administrator maintains native passwords 512 for a user at each native datastore 504, 506, and 508. The federated datastore server 502 has a table that maps the native password 512 for a user to the federated password 510. Therefore, with the federated password 510, the native datastore 504, 506, or 508 returns the native password 512 in encrypted form. The encryption is performed using the password system of the present invention.

For each native password 512, the federated datastore server 502 stores the encrypted native password 512. Then, when the user wishes to retrieve data from one of the native datastores 504, 506, or 508, the federated server 502 decrypts the native password 512 and uses the native password 512 to attempt to retrieve data from a particular native datastore 504, 506, and 508. The decryption is performed using the password system of the present invention.

The password system generates a tagged password that consists of an encrypted password and a tag. Additionally, the password system uses a unique procedure for generating the tag from the encrypted password. A password is initially input to a DES system for encryption. After the encrypted password is returned from the DES system, the password system generates a tag from the encrypted password. The tag carries information to ensure that the "00000000" byte is handled properly, that compatibility is maintained in different language environments (e.g., C and Java), and that the tagged password can be displayed as printable characters.

The password system has a number of benefits. For example, the password system supports bi-directional encryption and decryption. This is an improvement over the existing password encryption/decryption technique, which has a problem with decryption in one language environment of a password that has been encrypted in another language environment. Additionally, multiple language support is available for C, C++, and Java The compatibility between ASCII codes and Unicode codes is maintained by ensuring that the encrypted characters are in the range of decimal 32 to decimal 126 (which are ASCII codes representing printable ASCII characters). The decrypted string is shown as a printable character string. Since all the encrypted characters are in the range of decimal 32 to decimal 126, they can be displayed as printable characters. This is an advantage for processing the password. Moreover, the encrypted password can be easily stored in a flat file or a database table.

The password system encompasses the structure of a tagged password that consists of an encrypted password and a tag, as well as a procedure that generates the tag from the encrypted password.

The password system takes the string that needs to be encrypted (e.g., the native password) eight characters at a time and treats the eight characters as two 32-bit numbers. A DES system processes these two 32-bit numbers with the keys (0x1F38542A, 0xBC34612F) and returns an eight-character encrypted string. If the returned string contains non-printable ASCII characters, there will be problems when the string is encrypted using one language (e.g., C++) and decrypted using another language (e.g., Java). The password system solves this problem by ensuring that the encrypted characters are in the range of 32 (i.e., 0x20 in hexadecimal) and 126 (i.e., 0x7E in hexadecimal). In this range Unicode characters are equivalent to the ASCII characters (as well as ISO8859-1 (Latin-1) characters). The password system uses a tag with four control characters to ensure that the encrypted characters in the appropriate range.

A tagged password has a total length of 12 characters, consisting of an encrypted password of 8 characters and a tag of 4 characters. The password system receives an encrypted password from a DES system. Then, the password system generates a tag, which is a set of control characters, from the encrypted password. Below is a sample structure of an encrypted password, a tag, and their character positions.

|  | encrypted password | tag |
| --- | --- | --- |
| character position | B0 B1 B2 B3 B4 B5 B6 B7 | C0 C1 C2 C3 |

Each control character (e.g., C0, C1, C2, or C3) defines the control codes for two encrypted characters (e.g., B0, B1, B2, B3, B4, B5, B6, or B7). The relationship between the characters of the encrypted password and the control characters of the tag can be described as follows:
- control character C0 is generated from encrypted password characters B0 and B1.
- control character C1 is generated from encrypted password characters B2 and B3.
- control character C2 is generated from encrypted password characters B4 and B5.
- control character C3 is generated encrypted password characters from B6 and B7.

Each control character has eight bits. The following is a sample structure for one control character (e.g., C0, C1, C2, or C3):

|  | one control character |
| --- | --- |
| bit position | 0 1 2 3 4 5 6 7 |

Bit 0 and bit 1 are used to ensure that the control character is within the range of 32 to 126 (i.e., is a printable character). Bit 2, bit 3, and bit 4 are set based on the value of the first encrypted password character that the control character is associated with. Bit 5, bit 6, and bit7 are set based on the value of the second character of the encrypted password that the control character is associated with. For example, control character C0 is associated with encrypted password characters B0 and B1. Therefore, bit 2, bit 3, and bit 4 are associated with encrypted password character B0. Also, bit 5, bit 6, and bit7 are associated with encrypted password character B1.

The first bit (bit 0) of a control character is always "off" (i.e., set to zero). This ensures that the control character is an ASCII character.

The second bit (bit1) of a control character is always "on" (i.e., set to one). This ensures that the decimal value of this control character is not less than 32 (i.e., is not a non-printable character having a code less than 32).

The third bit (bit 2) of a control character is set based on the first bit (bit 0) of the first encrypted password character to which that control bit corresponds. In particular, if bit 0 of the first encrypted password character is set to one, the password system changes bit 0 of the first encrypted password character to zero. This ensures that the first encrypted password character is an ASCII character, not a Unicode character. Additionally, the password system sets bit 2 of the control character to one. Setting bit 2 of the control character to one is an indication that bit0 of the first encrypted password character was reset (i.e., changed from one to zero). If bit 0 of the first encrypted password character is zero, the password system sets bit 2 of the control character to 0, without modifying the first encrypted password character.

The fourth bit (bit3) of a control character is set based on the value of the first encrypted password character. In particular, if the value of the first encrypted password character is less than 32 (i.e., a hexadecimal value of 0x20), the password system adds 32 to the value of the first encrypted password character. This ensures that the first encrypted password character is not less than 32 for printing purposes. Then, the password system sets bit 3 of the control character to one to indicate that 32 has been added to the value of the first encrypted password character. If the value of the first encrypted password character is equal to or greater than 32, the password system sets bit 3 of the control bit to zero, without modifying the first encrypted password character.

The fifth bit (bit 4) of the control character is based on the value of the first encrypted password character. In particular, if the value of the first encrypted password character is 127 (i.e., a hexadecimal value of 0x7F), the password system changes the first encrypted password character to 36 (i.e., a hexadecimal value of 0x24, which represents a '$' sign). This ensures that the first encrypted password character is not 127 for printing purposes. Also, the selection of a value of 36 is one example only, and other printable values may be used instead. Additionally, the password system sets bit 4 of the control bit to one to indicate that the first encrypted password character has been changed to 36. If the value of the first encrypted password character is not 127, the password system sets bit 4 to zero, without modifying the first encrypted password character.

The sixth bit (bit 5) of the control character is based on the value of the second encrypted password character. In particular, if bit 0 of the second encrypted password character is set to one, the password system changes bit 0 of the second encrypted password character to zero. This ensures that the second encrypted password character is an ASCII character, not a Unicode character. Additionally, the password system sets bit 5 of the control character to one to indicate that bit0 of the second encrypted password character was reset. If bit 0 of the second encrypted password character is zero, the password system sets bit 2 of the control character to 0, without modifying the second encrypted password character.

The seventh bit (bit 6) of the control character is based on the value of the second encrypted password character. In particular, if the value of the second encrypted password character is less than 32 (i.e., a hexadecimal value of 0x20), the password system adds 32 to the value of the second encrypted password character. This ensures that the second encrypted password character is not less than 32 for printing purposes. Then, the password system sets bit 6 of the control character to one to indicate that 32 has been added to the value of the second encrypted password character. If the value of the second encrypted password character is equal to or greater than 32, the password system sets bit 6 of the control bit to zero, without modifying the second encrypted password character.

The eighth bit (bit 7) of the control character is based on the value of the second encrypted password character. In particular, if the value of the second encrypted password character is 127 (i.e., a hexadecimal value of 0x7F), the password system changes the second encrypted password character to 36 (i.e., a hexadecimal value of 0x24, which represents a '$' sign). This ensures that the second encrypted password character is not 127 for printing purposes. Also, the selection of a value of 36 is one example only, and other printable values may be used instead. Additionally, the password system sets bit 7 of the control bit to one to indicate that the second encrypted password character has been changed to 36. If the value of the second encrypted password character is not 127, the password system sets bit 7 to zero, without modifying the second encrypted password character.

To ensure that the control character is in the range of 32 to 126 The first bit (bit 0) of the control character is set to 0, and the and second bit (bit 1) of the control character is set to 1. Additionally, since bits 3 and 4, and bits 6 and 7, are not set at the same time, the control character itself will not be 127.

Using the control characters, the password system can perform decryption of the tagged string (i.e., transform the string back to its original encrypted form for use in accessing native datastores). For example, for a control character, if bit 2 is on, the password system changes bit 0 of the first encrypted password character to 1. If bit 3 of the control character is on, the password system subtracts 32 from the first encrypted password character. If bit 4 of the control character is on, the password system changes the first character to 0x7f. Similarly, bits 5–7 are processed for a second encrypted password character.

For example, if the string to be encrypted is "password", after applying the DES system with keys (01F38542A, 0xBC34612F), the encrypted string is "0x 3e 0e 94 9d 91 54 18 dc". The password system transforms the encrypted string into the following tagged string: "0x 3e 2e34 3d 31 54 38 5c 42 76 70 54". The first 8 characters are the transformed, encrypted character string; and, the last 4 characters represent the control codes of the tag. The hexadecimal string corresponds to ">0.4=1T8/BvpT".

Figure 6:
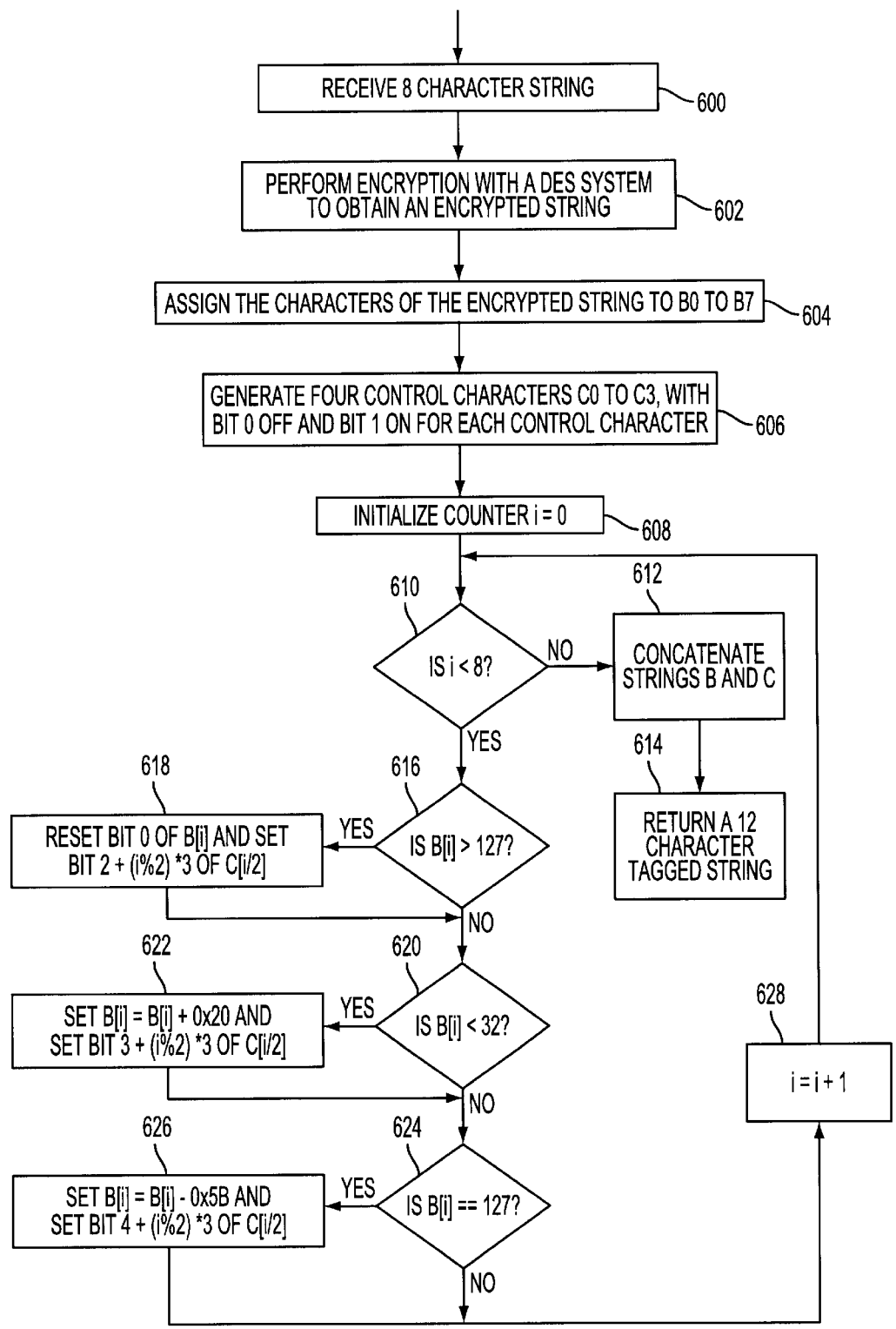
FIG. 6 is a flow diagram illustrating steps performed by the password system to generate a tagged.

FIG. 6 is a flow diagram illustrating steps performed by the password system to generate a tagged. In block 600, the password system receives an eight character string to be encrypted. In block 602, the password system performs encryption with a DES systems to obtain an encrypted string. In one embodiment, the received string is a native password that is used to access a native datastore.

In block 604, the password system assigns the characters of the encrypted string to B[0] to B[7] (string B). In block 606, the password system generates an initial tag of 4 control characters, C[0] to C[3] (string C). At t his point, the password system also sets bit 0 of each control character to 0 (to ensure that the control character is an ASCII character) and sets bit 1 of each control character to 1 (to ensure that the decimal value of the control character is not less than 32).

The iteration through blocks 608–628 may change the bits in the encrypted string characters and their corresponding control characters. In particular, blocks 616 and 618 handle bit 2 and bit 5 of a control character. Blocks 620 and 622 handle bit 3 and bit 6 of a control character. Blocks 624 and 626 handle bit 4 and bit 7 of a control character.

Continuing with the flow diagram, in block 608, the password system sets a counter "i" to zero. The counter is used to count through the encrypted string characters assigned to B0 to B7. In block 610, the password system determines whether the counter is less than 8. If the counter is less than 8, the password system continues to block 616, otherwise, the password system continues to block 612. That is, if each of the encrypted string characters (counted 0 to 7) are processed, the password system concatenates the encrypted string characters (i.e., string B) and the control characters (i.e., string C) in block 612. Then, in block 614, the password system outputs the twelve character tagged string.

In block 616, the password system determines whether an encrypted string character (B[i]) is greater than 127. If so, the password system continues to block 618, otherwise, the password system continues to block 620. In block 618, the password system resets bit 0 of the encrypted string character to zero (to ensure that the encrypted string character is an ASCII character) and sets a bit of the corresponding control character. The bit set is either bit 2 or bit 5, depending on whether the encrypted string character is the first or second character associated with the control character.

In block 620, the password system determines whether an encrypted string character (B[i]) is less than 32. If so, the password system continues to block 622, otherwise, the password system continues to block 624. In block 622, the password system adds 32 to the value of the encrypted string character, to ensure that the value of the encrypted string character is not less than 32 (i.e., characters less than 32 are not printable characters). Additionally, the password system sets a bit of the corresponding control character. The bit set is either bit 3 or bit 6, depending on whether the encrypted string character is the first or second character associated with the control character.

In block 624, the password system determines whether an encrypted string character (B[i]) is 127 (i.e., an unknown character). If so, the password system continues to block 626, otherwise, the password system continues to block 624. Therefore, in block 626, the password system sets the value of the encrypted string character to 36 (i.e., B[i] is 127, hexadecimal 0x5B is 91, and the difference is 36), which represents a dollar sign ($). Moreover, the password system sets a bit of the corresponding control character. The bit set is either bit 4 or bit 7, depending on whether the encrypted string character is the first or second character associated with the control character.

In block 628, the password system increments the counter. Then, the password system loops back to block 610.

Figure 7:
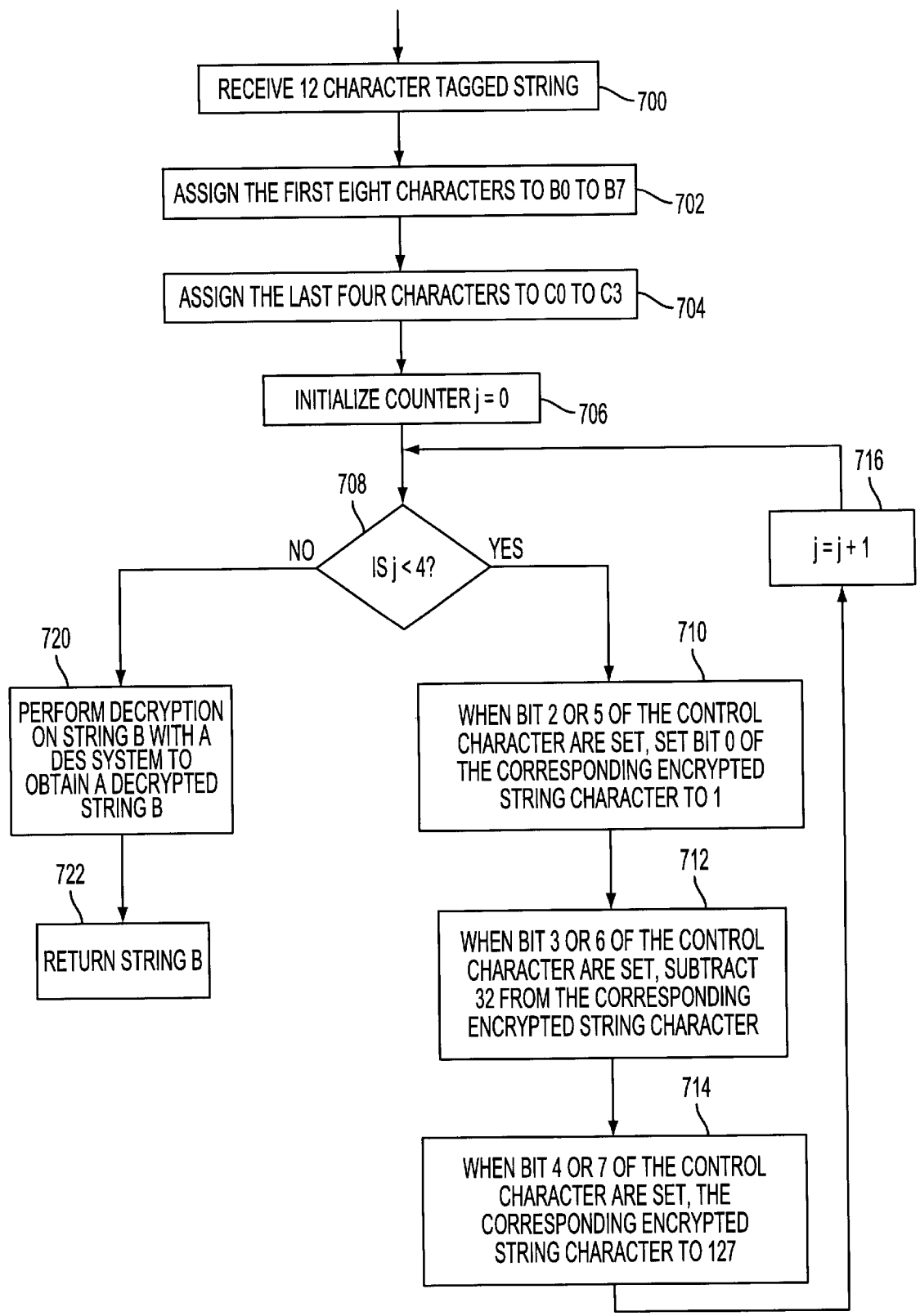
FIG. 7 is a flow diagram illustrating steps performed by the password system to transform a tagged string into its original format.

FIG. 7 is a flow diagram illustrating steps performed by the password system to transform a tagged string into its original format. In block 700, the password system receives a 12 character tagged string. In block 702, the password system assigns the first eight characters to B[0] to B[7] (string B). In block 704, the password system assigns the last four characters to C[0] to C[3] (string C). In b 706, the password system initializes counter j to zero. The counter is used to count through the control characters. In block 708, the password system determines whether the counter is less than 4. If so, the password system continues to block 710, otherwise, the password system continues to block 720.

In block 710, when bit 2 or bit 5 of a control character are set, the password system sets bit 0 of the corresponding encrypted string character to 1. As discussed above, each control character corresponds to two encrypted string characters. Thus, for bit 2, the corresponding encrypted string character is the first corresponding encrypted string character; for bit 5, the corresponding encrypted string character is the second corresponding encrypted string character. In block 712, when bit 3 or bit 6 of a control character are set, the password system subtracts 32 from the corresponding encrypted string character. For bit 3, the corresponding encrypted string character is the first corresponding encrypted string character; for bit 6, the corresponding encrypted string character is the second corresponding encrypted string character. In block 714, when bit 4 or bit 7 of the control character are set, the password system sets the corresponding encrypted character to 127. For bit 4, the corresponding encrypted string character is the first corresponding encrypted string character; for bit 7, the corresponding encrypted string character is the second corresponding encrypted string character. In block 716, the password system increments the counter and loops back to block 708.

In block 720, the password system performs decryption on string B with a DES system to obtain a decrypted string B. In block 722, the password system returns string B. In one embodiment, the resulting string B is a native password that is used to access a native datastore.

Conclusion

This concludes the description of the preferred embodiment of the invention. The following describes some alternative embodiments for accomplishing the present invention. For example, any type of computer, such as a miniframe, minicomputer, personal computer, mobile device, or embedded system, or computer configuration, such as a timesharing mainframe, local area network, or standalone personal computer, could be used with the techniques of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing one or more commands in a computer to perform a datastore operation on a datastore connected to the computer, the method comprising the steps of receiving a string of characters;

encrypting the string of characters based on a first character standard; and executing one or more software instructions on the computer for transforming the encrypted string of characters to be compatible with a second character standard.

2. The method of claim 1, wherein the first character standard is ASCII.

3. The method of claim 1, wherein the second character standard is Unicode.

4. The method of claim 1, wherein encrypting is performed using a DES system.

5. The method of claim 1, wherein transforming comprises generating a tagged string from the encrypted string of characters.

6. The method of claim 5, wherein the tagged string comprises control characters that identify transformations performed on the encrypted string of characters.

7. The method of claim 6, wherein transforming comprises ensuring that each control character is an ASCII character.

8. The method of claim 6, wherein transforming comprises ensuring that each control character is a printable character.

9. The method of claim 1, wherein transforming comprises ensuring that each encrypted string character is an ASCII character.

10. The method of claim 1, wherein transforming comprises ensuring that each encrypted string character is a printable character.

11. The method of claim 1, further comprising retransforming the encrypted string of characters that are compatible with a second character standard to be compatible with the first character standard.

12. The method of claim 11, wherein transforming comprises generating control characters that identify transformations performed on the encrypted string of characters.

13. The method of claim 12, wherein retransforming comprises using the control characters.

14. An apparatus for executing one or more commands in a computer, comprising:

a computer having a datastore coupled thereto, wherein the datastore stores a relational database; and one or more computer programs, performed by the computer, for receiving a string of characters, encrypting the string of characters based on a first character standard, and transforming the encrypted string of characters to be compatible with a second character standard.

15. The apparatus of claim 14, wherein the first character standard is ASCII.

16. The apparatus of claim 14, wherein the second character standard is Unicode.

17. The apparatus of claim 14, wherein encrypting is performed using a DES system.

18. The apparatus of claim 14, wherein transforming comprises generating a tagged string from the encrypted string of characters.

19. The apparatus of claim 18, wherein the tagged string comprises control characters that identify transformations performed on the encrypted string of characters.

20. The apparatus of claim 19, wherein transforming comprises ensuring that each control character is an ASCII character.

21. The apparatus of claim 19, wherein transforming comprises ensuring that each control character is a printable character.

22. The apparatus of claim 14, wherein transforming comprises ensuring that each encrypted string character is an ASCII character.

23. The apparatus of claim 14, wherein transforming comprises ensuring that each encrypted string character is a printable character.

24. The apparatus of claim 14, further comprising retransforming the encrypted string of characters that are compatible with a second character standard to be compatible with the first character standard.

25. The apparatus of claim 24, wherein transforming comprises generating control characters that identify transformations performed on the encrypted string of characters.

26. The apparatus of claim 25, wherein retransforming comprises using the control characters.

27. An article of manufacture comprising a program storage medium readable by a computer and embodying one or more instructions executable by the computer to perform method steps for executing one or more commands to perform a database operation on a relational database stored on a datastore connected to the computer, the method comprising the steps of:

receiving a string of characters;

encrypting the string of characters based on a first character standard; and transforming the encrypted string of characters to be compatible with a second character standard.

28. The article of manufacture of claim 27, wherein the first character standard is ASCIII.

29. The article of manufacture of claim 27, wherein the second character standard is Unicode.

30. The article of manufacture of claim 27, wherein encrypting is performed using a DES system.

31. The article of manufacturing of claim 27, wherein transforming comprises generating a tagged string from the encrypted of characters.

32. The article of manufacture of claim 31, wherein the tagged string comprises control characters that identify transformations performed on the encrypted string of characters.

33. The article of manufacture of claim 32, wherein transforming comprises ensuring that each control character is an ASCII character.

34. The article of manufacture of claim 32, wherein transforming comprises ensuring that each control character is a printable character.

35. The article of manufacture of claim 27, wherein transforming comprises ensuring that each encrypted string character is an ASCII character.

36. The article of manufacture of claim 27, wherein transforming comprises ensuring that each encrypted string character is a printable character.

37. The article of manufacture of claim 27, further comprising retransforming the encrypted string of characters that are compatible with a second character standard to be compatible with the first character standard.

38. The article of manufacture of claim 37, wherein transforming comprises generating control characters that identify transformations performed on the encrypted string of characters.

39. The article of manufacture of claim 38, wherein retransforming comprises using the control characters.

40. The method of claim 1, wherein the string of characters comprises a password.

41. The method of claim 40, wherein the password is a federated password that is mapped to at least one native password.

42. The apparatus of claim 14, wherein the string of characters comprises a password.

43. The apparatus of claim 42, wherein the password is a federated password that is mapped to at least one native password.

44. The article of manufacture of claim 27, wherein the string of characters comprises a password.

45. The article of manufacture of claim 44, wherein the password is a federated password that is mapped to at least one native password.

* * * * *